United States Patent
Nan

(10) Patent No.: US 8,898,405 B2
(45) Date of Patent: Nov. 25, 2014

(54) METHOD FOR STATIC WEAR LEVELING IN NON-VIOLATE STORAGE DEVICE

(75) Inventor: Yen Chih Nan, Hsinchu (TW)

(73) Assignee: Storart Technology Co. Ltd, Hsinchu (TW)

( * ) Notice: Subject to any disclaimer, the term of this patent is extended or adjusted under 35 U.S.C. 154(b) by 270 days.

(21) Appl. No.: 13/547,592

(22) Filed: Jul. 12, 2012

(65) Prior Publication Data

US 2014/0019669 A1    Jan. 16, 2014

(51) Int. Cl.
*G06F 12/00* (2006.01)
*G06F 13/00* (2006.01)
*G06F 13/28* (2006.01)
*G06F 12/02* (2006.01)

(52) U.S. Cl.
CPC .... *G06F 12/0246* (2013.01); *G06F 2212/7211* (2013.01)
USPC ............................ 711/159; 711/103; 711/165

(58) Field of Classification Search
CPC ................... G06F 12/0246; G06F 2212/7211; G06F 2212/1036
USPC .................................. 711/103, 154, 159, 165
See application file for complete search history.

(56) References Cited

U.S. PATENT DOCUMENTS

| | | | |
|---|---|---|---|
| 8,700,839 B2* | 4/2014 | Chang et al. | 711/103 |
| 2003/0046487 A1* | 3/2003 | Swaminathan | 711/106 |
| 2004/0177212 A1* | 9/2004 | Chang et al. | 711/103 |
| 2007/0208904 A1* | 9/2007 | Hsieh et al. | 711/103 |
| 2011/0138109 A1* | 6/2011 | Liu et al. | 711/103 |
| 2011/0231594 A1* | 9/2011 | Sugimoto et al. | 711/103 |
| 2011/0246705 A1* | 10/2011 | Mudama et al. | 711/103 |
| 2012/0036312 A1* | 2/2012 | Feldman et al. | 711/103 |
| 2012/0089768 A1* | 4/2012 | Mothilal | 711/103 |

\* cited by examiner

*Primary Examiner* — Ryan Bertram
(74) *Attorney, Agent, or Firm* — Che-Yang Chen; Law Office of Michael Chen

(57) ABSTRACT

A method for static wear leveling in non-violate storage device is disclosed. Use the method to balance all blocks' erasure counts to avoid most blocks having smaller erasure count and several blocks having larger erasure count to shorten the life time of the device.

3 Claims, 2 Drawing Sheets

| High erasure count free queue | Block number | 99 | 100 | 130 | 133 | 144 |
| | Erasure count | 25 | 23 | 23 | 23 | 22 |

| Free queue | Block number | 2 | 4 | 44 | 56 | 87 |
| | Erasure count | 3 | 5 | 5 | 6 | 7 |

| Occupied count queue | Block number | 60 | 70 | 73 | 66 | 75 |
| | Occupied count | 9000 | 8500 | 8000 | 7989 | 7867 |
| | Erasure count | 21 | 7 | 9 | 8 | 18 |

| Least erasure count date block queue | Block number | 13 | 15 | 21 | 35 | 33 |
| | Erasure count | 2 | 3 | 3 | 4 | 5 |

FIG. 2

METHOD FOR STATIC WEAR LEVELING IN NON-VIOLATE STORAGE DEVICE

FIELD OF THE INVENTION

The present invention provides a method for static wear leveling in non-violate storage device.

BACKGROUND OF THE INVENTION

The life time of a storage device is based on the block erasure count. If a block's erasure count is over a limitation, the block will be broken and not able to program correct data.

SUMMARY OF THE INVENTION

An objective of this invention is providing a method for static wear leveling in non-violate storage device, which is capable of balancing all blocks' erasure count to avoid most blocks having smaller erasure count and several blocks having larger erasure count to shorten the life time of the device.

To achieve above objectives, A method for static wear leveling in non-violate storage device is disclosed, and the steps of the method are comprising:
- step SA01: maintaining blocks, the blocks are including at least one occupied count block and at least one erasure count block;
- step SA02: judging if a controller issues an erase command to a flash memory; if no, back to step SA01; if yes, continue next step;
- step SA03: adding one to an erasure count of the erasure block;
- step SA04: adding one to an occupied count of the using block;
- step SA05: judging if wear leveling is triggered; if no, back to step SA01; if yes, continue next step;
- step SA06: choosing a block having higher occupied count and lower erasure count to move; and
- step SA07: moving data stored in the flash memory and looping to step SA01.

Further features and advantages of the present invention will become apparent to those of skill in the art in view of the detailed description of preferred embodiments which follows, when considered together with the attached drawings and claims.

BRIEF DESCRIPTION OF THE DRAWINGS

All the objects, advantages, and novel features of the invention will become more apparent from the following detailed descriptions when taken in conjunction with the accompanying drawings.

FIG. 2 is an embodiment according to the present invention.

DESCRIPTION OF THE PREFERRED EMBODIMENT

Figure 1:
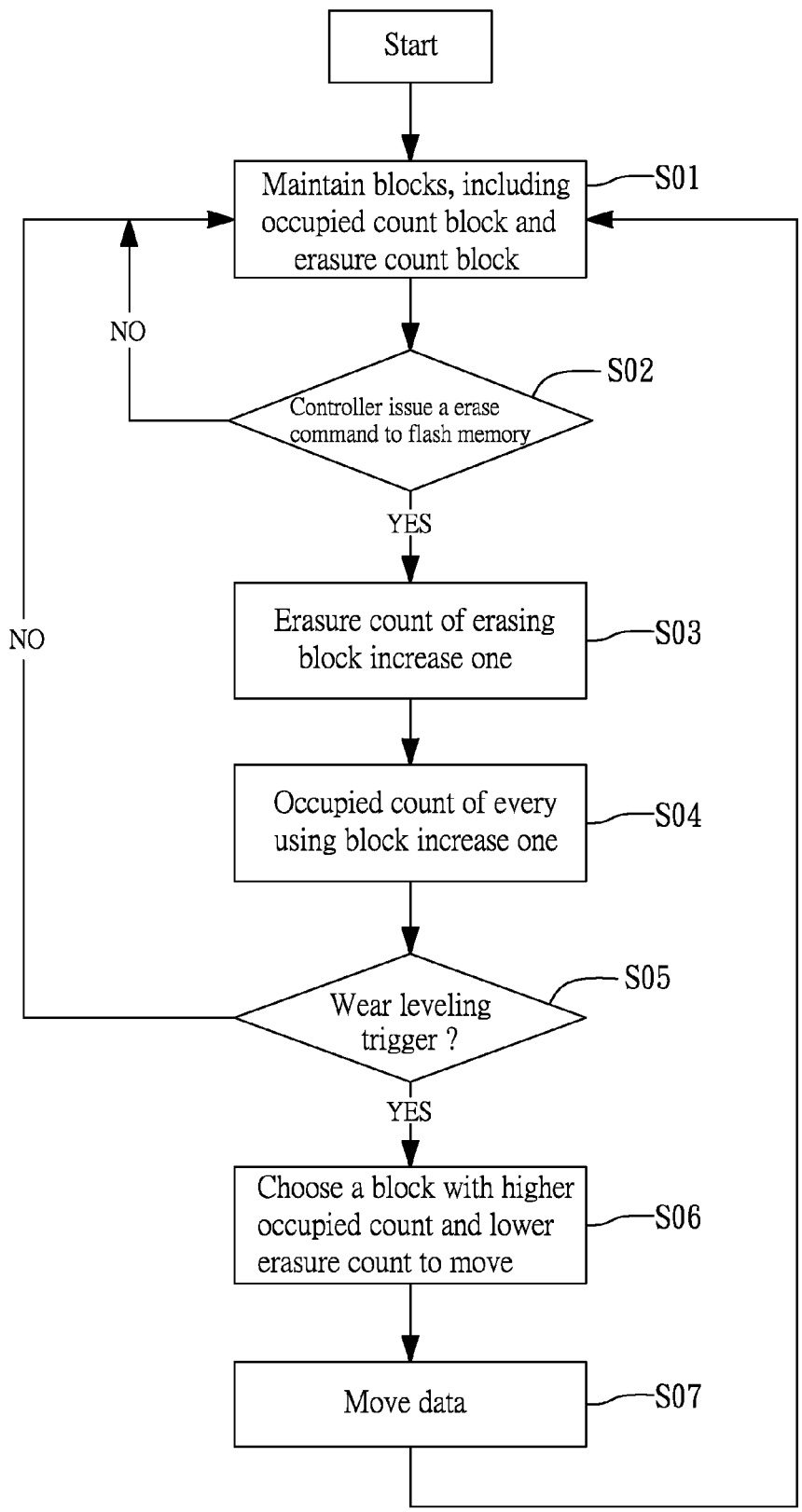
FIG. 1 is a flowchart showing a method for static wear leveling in non-violate storage device according to the present invention.

Referring now to the drawings where like characteristics and features among the various figures are denoted by like reference characters.

Please refer to FIG. 1, which is a flowchart showing a method for static wear leveling in non-violate storage device according to the present invention.

The steps for the process of a method for static wear leveling in non-violate storage device according to the present invention are:
- step S01: maintaining blocks, the blocks are including at least one occupied count block and at least one erasure count block;
- step S02: judging if a controller issues an erase command to a flash memory; if no, back to step S01; if yes, continue next step;
- step S03: adding one to an erasure count of the erasure block;
- step S04: adding one to an occupied count of the using block;
- step S05: judging if wear leveling is triggered; if no, back to step S01; if yes, continue next step;
- step S06: choosing a block having higher occupied count and lower erasure count to move; and
- step S07: moving data stored in the flash memory and looping to step S01.

A special block, which is called erasure count block, is set to record the erasure counts of all physical blocks. If a controller issues the erase command to a physical block, the controller will add one to erasure count corresponding to an address of each physical block.

Another block, which is called occupied count block, is set to record occupied count of all physical blocks. The occupied count means how many times controller issues an erase command to erase other blocks and didn't erase this using block. If the controller issues an erase command to a physical block, the controller will add one to all occupied counts of the using physical blocks except the erasing block. The controller will reset the occupied count of the erasing block to zero.

The controller will store some kinds of queue in the flash memory, the non-violate device (ex. SRAM):
1: High erasure count free queue: Queue of the block is not using and has highest erasure count.
2: Free queue: Queue of the block is not using and has least erasure count.
3: High occupied count queue: Queue of the block is using and has highest occupied count.
4: Least erasure count data block queue: Queue of the block is using and has least erasure count.

Please refer to FIG. 2, which is an embodiment according to the present invention.

High erasure count free queue will record block number and the corresponding erasure count. Free queue will record block number and the corresponding erasure count. High occupied count queue will record block number, the corresponding occupied count and corresponding erasure count. Least erasure count data block queue will record block number and the corresponding erasure count.

The wear leveling trigger is the difference between the highest erasure count of free block and the least erasure count of using block. In FIG. 2, the highest erasure count of the free block is "25" and the least erasure count of the using block is "2". If the difference between the two values over a threshold, the controller will trigger the wear leveling. After wear leveling trigger, the controller will pick a block to swap data from the occupied count queue. The pick rule is picking higher occupied count and lower erasure count. In FIG. 2, the block number "60" has the highest occupied count but also has the higher erasure count. The controller will skip it and won't pick it to swap data.

The next block number "70" has the second highest occupied count and lower erasure count. It is a good candidate to be picked to swap data. The controller will pick a free block with the highest erasure count in high erasure count block free queue. In FIG. 2, the controller will pick block number "99". After swapping the data of the block number "70" to block number "99", the block number "70" will remove from the occupied count queue and block number "99" will remove from the high erasure count free queue. Then, close wear leveling trigger.

Therefore, the method according to this invention is capable of balancing all blocks' erasure count to avoid most blocks having smaller erasure count and several blocks having larger erasure count to shorten the life time of the device.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A method for static wear leveling in non-violate storage device, comprising the steps of:
    step SA01: recording occupied count and erasure count of each physical block in the non-violate storage device;
    step SA02: judging if a controller issues an erase command to the non-violate storage device;
    step SA03: incrementing the erasure count of an erasure block by one while data is erased from the erasure block according to the erase command;
    step SA04: incrementing the occupied count of an occupied block by one while data is written to the occupied block;
    step SA05: triggering wear leveling while the difference between the highest occupied count of a non-occupied block and the lowest erasure count of the occupied block exceeds a predetermined value;
    step SA06: choosing a block having higher occupied count and lower erasure count to move; and
    step SA07: moving data stored in the block chosen in step SA06.

2. The method as claimed in claim 1, wherein the erasure counts of all physical blocks are recorded in an erasure count block, and the controller adds one to the erasure count corresponding to an address of each physical block if the erase command is issued.

3. The method as claimed in claim 2, wherein the occupied counts of all occupied physical blocks are recorded in an occupied count block, the occupied count shows how many times an erase command is issued to erase other blocks and not the occupied blocks, the controller adds one to the occupied counts of all occupied physical blocks except for the erasure block if the erase command is issued, and the controller resets the occupied count of the erasure block to zero.

* * * * *